United States Patent [19]

Shinjo

[11] Patent Number: 5,299,441
[45] Date of Patent: Apr. 5, 1994

[54] METHOD OF MAKING A MANDREL COMPRISING A DRILL SECTION FOR A SELF-DRILLING BLIND RIVET

[75] Inventor: Katsumi Shinjo, Osaka, Japan

[73] Assignee: Yugenkaisha Shinjo Seisakusho, Osaka, Japan

[21] Appl. No.: 18,137

[22] Filed: Feb. 18, 1993

[51] Int. Cl.⁵ .................................................. B21K 1/44
[52] U.S. Cl. ..................................... 72/356; 470/28; 470/32; 76/108.1
[58] Field of Search ........................ 470/28, 32, 31, 9; 411/29, 30, 31, 902; 72/356, 352; 76/101.1, 102, 108.1, 108.6; 7/158

[56] References Cited

U.S. PATENT DOCUMENTS

| | | | |
|---|---|---|---|
| 1,399,132 | 12/1921 | Lindquist | 470/28 |
| 2,656,739 | 10/1953 | Mansfield | 76/101.1 |
| 3,104,161 | 9/1963 | Carlson | 470/9 |
| 4,026,186 | 5/1977 | Williams et al. | 411/29 |
| 4,365,495 | 12/1982 | Francis | 470/28 |
| 4,998,853 | 3/1991 | Shinjo | 411/29 |

FOREIGN PATENT DOCUMENTS

| | | | |
|---|---|---|---|
| 0003935 | 1/1956 | Fed. Rep. of Germany | 470/9 |
| 0274930 | 11/1989 | Japan | 76/108.1 |
| 3-009110 | 1/1991 | Japan | 470/9 |
| 3-161219 | 7/1991 | Japan | 76/108.1 |

Primary Examiner—Lowell A. Larson
Assistant Examiner—Michael J. McKeon
Attorney, Agent, or Firm—Antonelli, Terry, Stout & Kraus

[57] ABSTRACT

A method of making an elongated mandrel having an end integral with a drill section, with the method including the steps of subjecting a single columnar piece of material to the heading process so as to make a blank N composed of the mandrel, a short stem having one end integral with the end of the mandrel and having a diameter D greater than a diameter of the mandrel, and a flange formed integral with the other end of the stem. The short stem is then cold forged to produce the drill section having end edges (7a) and (7b) facing the flange, and, subsequently, the drill section is trimmed so as to remove the flange together with a scrap resulting from the cold forging of the stem, in such a manner that the mandrel having the integral drill section can be mass produced from the single piece of raw material, efficiently at a reduced cost.

8 Claims, 6 Drawing Sheets

FIG.7
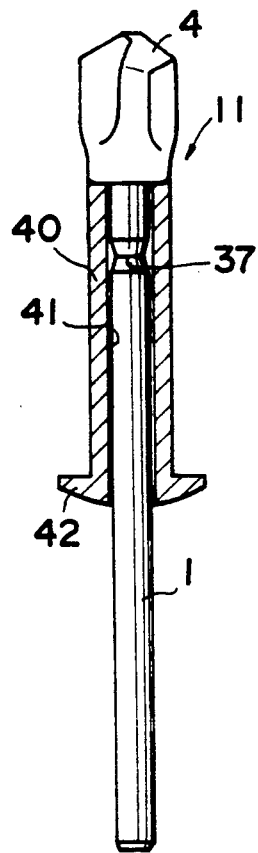
FIG.8(a)    FIG.8(b)    FIG.8(c)
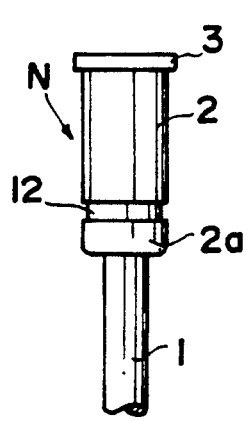 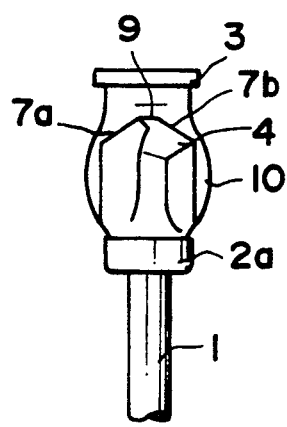 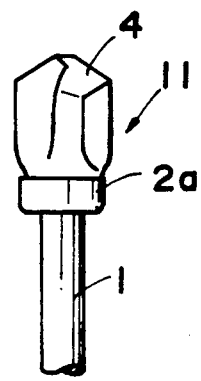

5,299,441

METHOD OF MAKING A MANDREL COMPRISING A DRILL SECTION FOR A SELF-DRILLING BLIND RIVET

BACKGROUND OF THE INVENTION

The present invention relates to a method of making a mandrel comprising a drill section for constructing a self-drilling blind rivet.

The prior art "self-drilling blind rivet" comprises a tubular rivet body and an elongated mandrel inserted through the rivet body. The elongated mandrel has at its one end a drill section capable of self-drilling an object in which the blind rivet is to be attached. The drill section has an outer diameter comparatively greater than that of the tubular rivet body. However, there has not been offered any effective method to mass produce such a drill section at the end of the elongated mandrel. Consequently, a great demand for this type of blind rivet has not been met with a sufficient supply.

To met this demand, Japanese Patent Laying-Open Gazette Hei. 2-197347 and corresponding to U.S. Pat. No. 4,998,853 propose a method wherein a short drill tip is adjoined or welded to one end of a mandrel.

This previous method has however proved not necessarily satisfactory due to a certain difficulty in ensuring an coaxial relationship between each mandrel and each drill tip joined thereto. Thus, the mass production of the blind rivet according to the proposed method has not been realized, because a specially designed automatic welder is required, which welder is not presently available.

SUMMARY OF THE INVENTION

Therefore, an object of the present invention is to provide a highly efficient method for the mass production of a mandrel comprising a drill section for enabling a construction of a self-drilling blind rivet, wherein the drill section is not a separate tip joined to the mandrel but is formed in one piece together with the mandrel from a single piece of raw material.

According to the present invention, the method of making an elongated mandrel having an end integral with a drill section does comprise the steps of subjecting a single columnar piece of material to a heading process so as to make a blank composed of the elongate mandrel having a diameter "d", a short stem integral with the end of the mandrel and having a diameter "D" greater than the diameter that "d" of the mandrel, and a flange integral with the short stem and extending from one end thereof opposite to the mandrel; then cold forging the stem to produce the drill section having end edges disposed to face the flange; and subsequently trimming the drill section so as to remove therefrom the flange together with a scrap possibly resulting from the cold forging of the short stem.

The blank mentioned above may be a piece of hardenable steel so that only its drill section is hardened in a high-frequency heating apparatus. Alternatively, the blank may be made of a low carbon steel and subsequently carburized before only the drill section is selectively hardened in the high-frequency heating apparatus.

The method proposed herein will enable not only the mass production of the blank by using any conventional type of the headers, but also the efficient forming of the drill section by the conventional cold forging technique.

BRIEF DESCRIPTION OF THE DRAWINGS

FIG. 7 is a partial cross-section front elevation of a self-drilling blind rivet which comprises the mandrel having the drill section;

FIGS. 8(a) to 8(c) schematically illustrate the steps of forming the drill section in a modified embodiment of the present invention.

DETAILED DESCRIPTION OF PREFERRED EMBODIMENT

Figure 1A:
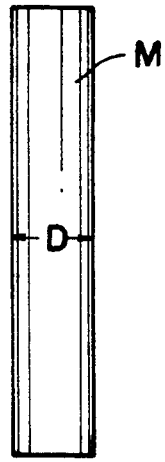
FIGS. 1(a) to 1(c) shematically illustrates by steps of making a blank in an embodiment of the method proposed herein.
Figure 1B:
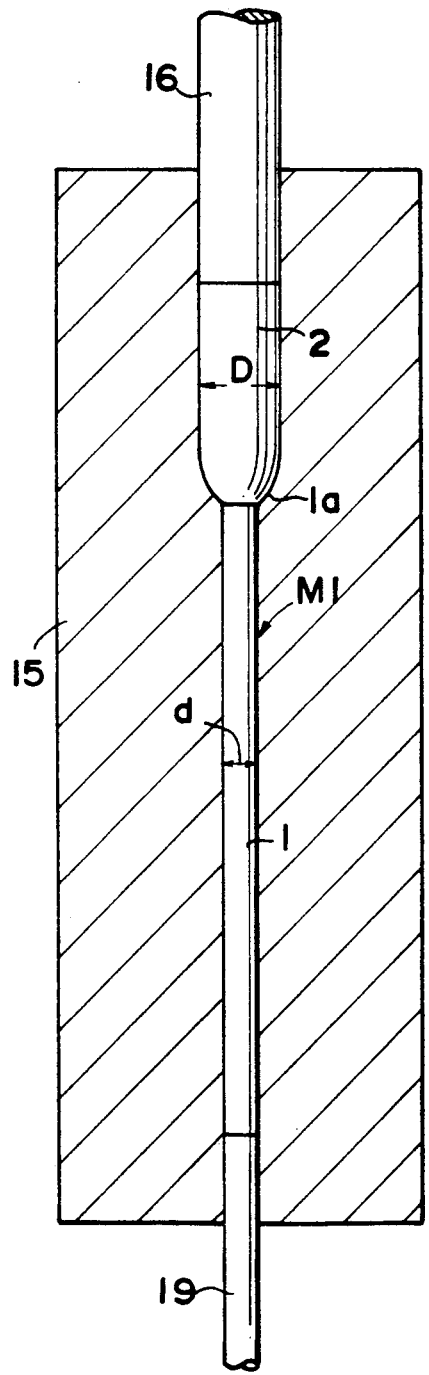
Figure 1C:
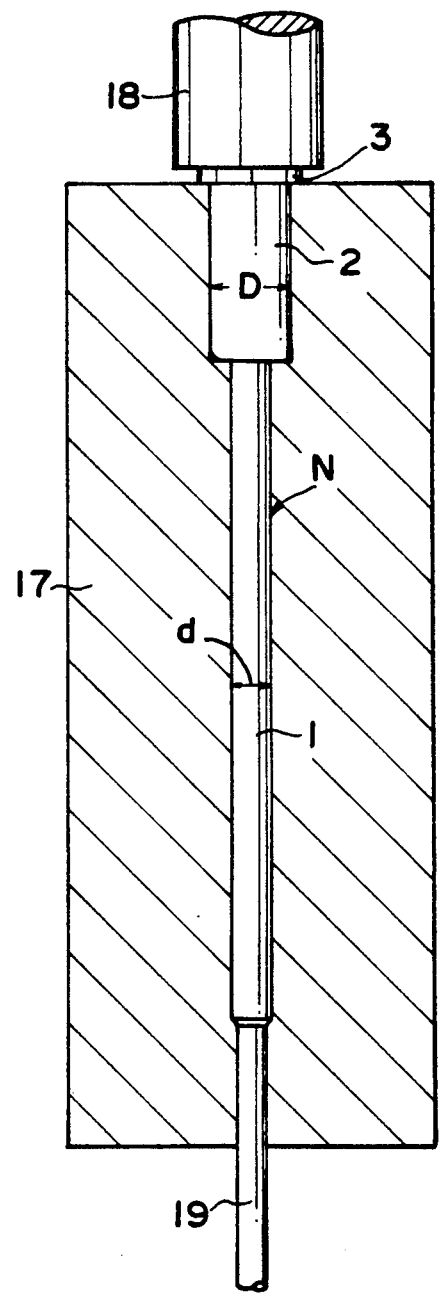

FIGS. 1(a) to 1(c) illustrate the step of producing a finished blank N. A columnar piece M shown in FIG. 1(a) is a raw material used to prepare the finished blank M, and is a length severed from a raw coil of a hardenable carbon steel. The diameter D of the columnar piece M is slightly less than a diameter d of a drill section which will be described below in detail. The heading process is carried out using at first a pressing punch 16 to force the columnar piece M downwardly into a diameter-reducing die 15. A thin and elongated mandrel 1, which is formed in this way from a lower portion of the columnar piece M, will have a diameter d substantially equal to a half of the diameter D of said piece M. At the same time as the elongated mandrel 1 is formed, a short stem 2 for the drill section will also be formed thicker from an upper portion of the columnar piece M. The short stem 2 integral with the elongated mandrel 1 is of a diameter substantially equal to the diameter of the columnar piece M, such that a reduced and curved zone 1a appears between the short stem 2 and the elongated mandrel 1, thus providing a transitional blank M1. Subsequently, this transitional blank M1 will be transferred into a finishing die 17 shown in FIG. 1(c). At this stage, another punch 18 forces the transitional blank M1 downwardly so that the curved zone 1a disappears, and a flange 3 is formed integral with the short stem 2 at its end opposite to the elongated mandrel 1. A lower end of the elongated mandrel 1 is chamfered simultaneously by the die 17, thus providing a finished blank N. The flange 3 disposed at an extremity of the finished blank N will facilitate the automatic control of the following step of cold forging the drill section 4. Particularly, the transportation and positioning of the finished blank N at that step can be done easily and smoothly by virtue of this flange 3. The reference numeral 19 denotes a knock-out pin.

Figure 2A:
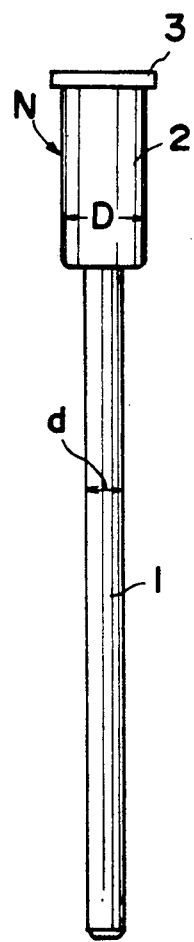
FIGS. 2(a) to 2(c) show the step of forming a drill section from the blank of FIGS. 1(a)-1(c)
Figure 2B:
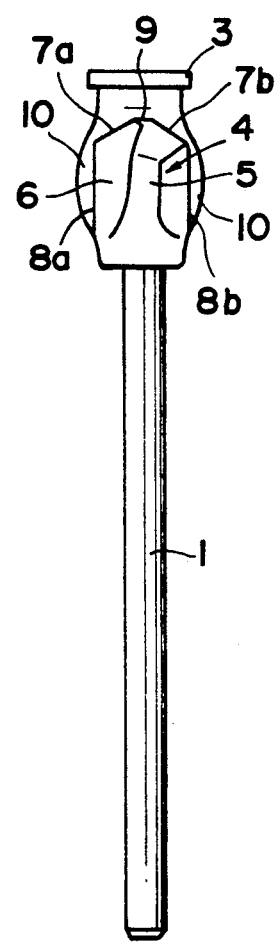
Figure 2C:
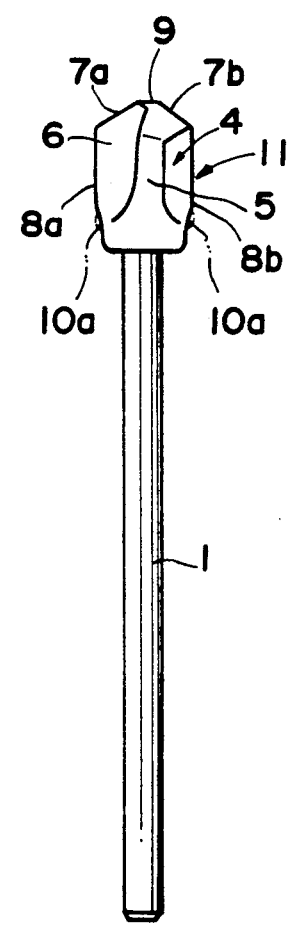
Figure 3:
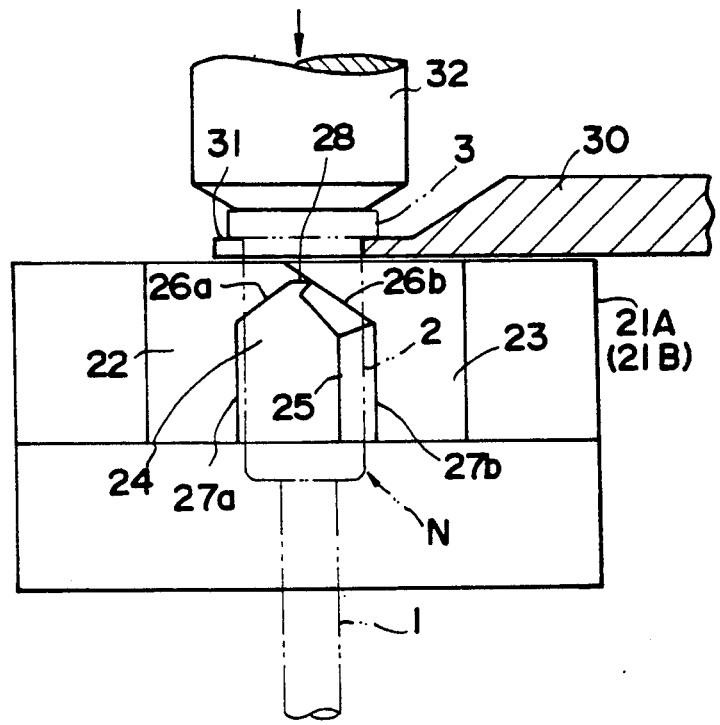
FIG. 3 is a partial cross-sectional front elevation of a pair of molds used for the cold forging of the drill section.
Figure 4:
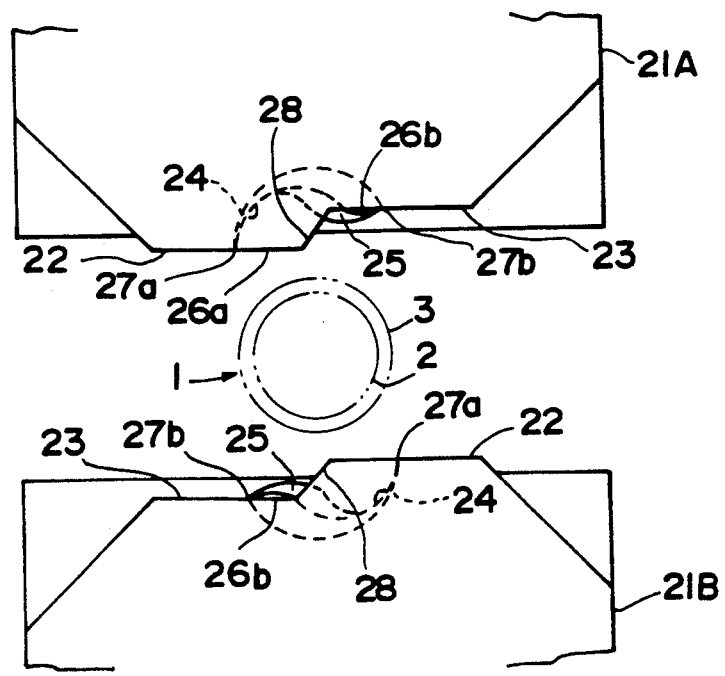
FIG. 4 is an exploded plan view showing of the pair of opposed molds of FIG. 3.

FIGS. 2(a) to 2(c) illustrate the step of cold forging the drill section 4 previously mentioned. A pair of molds 21A and 21B of a pinch pointer as shown in FIGS. 3 and 4 will forcibly grip the short stem 2 so as to cold forge the short stem 2. The contour of the drill section 4 is produced by the inner engraved surfaces of the molds, and a swelling excessive material will bulge out of the molds to form a scrap 10 along and around the outer periphery of the thus forged drill section.

The configuration of the mating molds 21A and 21B are as follows. They are of the same shape and arranged symmetrical with each other as shown in FIGS. 3 and 4, and each mold has the inner surface composed of two ( or "first" and "second") flat zones 22 and 23 extending stepwise and in parallel with one another. A recess 24 for forming one of lands 5 on the drill section 4 is engraved to initiate from the first of the flat zones 22. A protrusion 25 for forming a ( chip-discharging ) vertical groove 6 on the drill section initiates from the other, i.e., "second", flat zone 23. A first sharp ridge 26a, defining one of end edges 7a of the drill section, is disposed, together with a third sharp ridge 27a defining one of side edges 8a, to terminate at the first flat zone 22. On the other hand, a second sharp ridge 26b defining the other end edges 7b of the drill section is disposed, together with a fourth sharp ridge 27b defining the other side edges 8b, to similarly terminate at the second flat zone 23. A top end of the first sharp ridge 26a is connected by a short straight line to a top end of the second sharp ridge 26b, in such a manner that the straight line provides a fifth ridge for forming a chisel edge on the drill section 4.

The drill section 4 will be produced in the following manner using the pair of the molds 21A and 21B. At first, the finished blank N will be supported at its flange 3 on a suporting end 31 of a feeder disc 30, and then transported into and positioned between the molds 21A and 21B. Then, the flange 3 will be urged in a downward direction by a retainer pin 32 in a direction indicated by the arrow in FIG. 3 by a spring (not shown), while the molds 21A and 21B are strongly pressed towards each other to cold forge the stem 2 to fashion the drill section 4. This drill section 4 produced in this way will have the end edges 7a and 7b as well as the chisel edge 9, which edges are in such a position as facing the flange 3 as shown in FIG. 2(b). The scrap 10 extends along, around and integral with the periphery of the drill section. Subsequent to this stage, any conventional trimming die (not shown) may be used to remove from the drill section the scrap 10 together with the flange. As a result, a drilling mandrel 11 composed of the elongated mandrel 1 integral with the thicker drill section 4 will be obtained as illustrated in FIG. 2(c).

In a modification of the embodiment, an annular recess 12 may be formed prior to the cold forging step at a boundary between a major portion and a minor portion of the short stem 2, so that only the former is forged, with the latter portion 2a being left unforged. Such an additional step is effective to prevent any possible flash 10a from remaining unremoved from the ends of side edges 8a and 8b of the drill section 4, as indicated by the phantom line in FIG. 2(c), when the trimming of the scrap 10 is done. Even if any residual portion of the flash 10a would remain, it will be accommodated in the recess 12 not to impair the drilling performance.

Figure 9A:
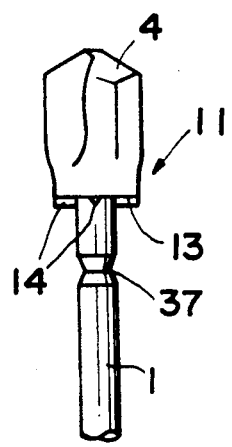
FIGS. 9(a) and 9(b) are a front elevation and a bottom view, respectively, showing the mandrel with the drill section which are manufactured in accordance with a further embodiment of the present invention.
Figure 9B:
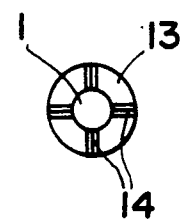

In a further modification, some radially extending protrusions 14 may be formed on a shoulder surface 13 between the stem 2 and the mandrel 1 in a manner shown in FIGS. 9(a) and 9(b), when the finished blank N is made. Those protrusions 14 will play a certain important role when the blind rivet is used, which rivet will be composed of the mandrel 1 inserted through a tubular rivet body 40 shown in FIG. 7. Such protrusions 14 will claw the end surface of the rivet body 40 so that a torque can be transmitted to the drill section 4 not only through the mandrel 1 but also from the rivet body through the protrusions 14, thus enabling the drill section 4 to be driven with a sufficient force.

Figure 5:
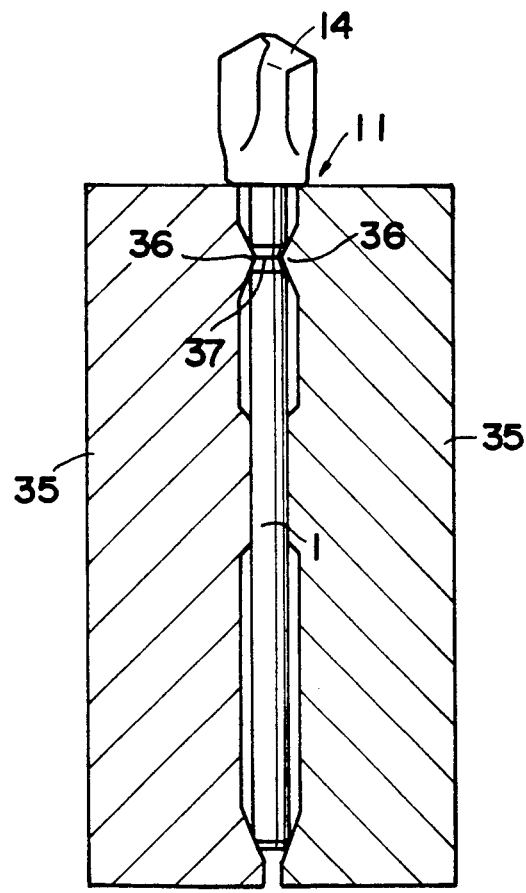
FIG. 5 is a cross-sectional view illustrating a step of forming a breakable annular groove on a mandrel as a portion of the blank.
Figure 6:
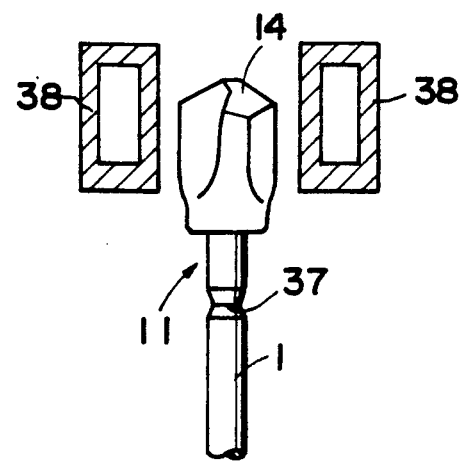
FIG. 6 is a schematic view of the step of heating and hardening the drill section.

The elongated mandrel 11 having the drill section 4 integral therewith will then be rolled between a pair of rolling dies 35 opposed to each other, as shown in FIG. 5. Ridges 36 on the rolling dies will thus produce a breakable annular groove 37 of a reduced diameter extending around the periphery of the mandrel portion near the drill section 4. Instead of such a groove, it may also be possible to produce a breakable recessed zone by the pinch pointer while it grips and cold forges the elongated mandrel 1. FIG. 6 illustrates a further step of selectively hardening only the drill section 4 in a high-frequency heating coil apparatus 38. In a case wherein the raw material or columnar piece M for the finished blank N is a low carbon steel, an appropriate step of carburizing the material must be effected before the selective hardening step.

FIG. 7 shows a self-drilling blind rivet which is assembled by fitting the tubular rivet body 40 on the finished mandrel 11 having the hardened drill section. The rivet body has a central bore 41 for receiving the elongated mandrel 1 as well as a flange-like portion 42 integral with an end of said body 40. Usually, the rivet body 40 is made of a softer metal such as an aluminum alloy.

According to the method described above, the elongated mandrel having its one end formed integral with the drill section of a larger diameter can be manufactured from a single piece of a raw material, efficiently at a mass production scale and a reduced cost, by using any of the conventional heading machines and cold forging apparatuses.

What is claimed is:

1. A method of making an elongated mandrel having an end integral with a drill section, the method comprising the steps of:

subjecting a single columnar piece of material to a heading process so as to form a blank comprising the elongated mandrel having a diameter, a short stem integral with an end of the mandrel and having a diameter greater than the diameter of the mandrel, and a flange integral with the short stem and extending from one end thereof opposite to the mandrel;

then cold forging the stem to produce the drill section in such a manner that end edges of the drill section face the flange; and subsequently trimming the drill section so as to remove the flange together with a scrap resulting form the cold forging of the short stem.

2. The method as defined in claim 1, further comprising the step of forming one of a breakable annular groove or recessed zone on a portion intermediate opposite ends of the mandrel.

3. The method as defined in one of claims 1 or 2, and further comprising the step of selectively hardening the drill section of the blank by using a high-frequency heating apparatus, wherein the blank is made of a hardenable steel.

4. The method as defined in one of claims 1 or 2, and further comprising the step of selectively hardening the drill section of the blank by using a high-frequency heating apparatus, after previously carburising the blank, wherein the blank is made of a low carbon steel.

5. A method of making an elongated mandrel having an end integral with a drill section, the method comprising the steps of:

subjecting a single columnar piece of material to a heading of process so as to form a blank comprising the elongated mandrel having a diameter, a short stem integral with an end of the mandrel and having a diameter greater than the diameter of the mandrel, and a flange integral with a short stem and extending from one end thereof opposite to the mandrel;

then cold forging the stem to produce the drill section having end edges disposed to face the flange;

subsequently trimming the drill section so as to remove therefrom the flange together with scrap resulting from the cold forging of the short stem; and preliminarily forming an annular recess at a boundary between a portion of the stem from which the drill section is to be cold forged and another portion of the stem which is to remain unforged, wherein the step of preliminary forming is conducted before the step of cold forging.

6. A method of making an elongated mandrel having an end integral with a drill section, the method comprising the steps of:

subjecting a single columnar piece of material to a heading process so as to form a blank comprising the elongated mandrel having a diameter, a short stem integral with an end of the mandrel and having a diameter greater than the diameter of the mandrel, and a flange integral with a short stem and extending from one end thereof opposite to the mandrel;

then cold forging the stem to produce the drill section having end edges disposed to face the flange; and, subsequently trimming the drill section so as to remove the flange together with scrap resulting from the cold forging of the short stem, and wherein a plurality of radially extending protrusions are formed on a shoulder surface between the stem and the mandrel at the same time as the blank is formed in the heading process.

7. The method as defined in one of claims 5 or 6, further comprising the steps of selectively hardening the drill section of the blank by using a high-frequency heating apparatus, wherein the blank is made of a hardenable steel.

8. The method as defined in one of claims 5 or 6, and further comprising the step of selectively hardening the drill section of the blank by using a high-frequency heating apparatus, after previously carburising the blank, wherein the blank is made of a low carbon steel.

* * * * *